June 30, 1959     L. B. GRIFFITH     2,892,414
SEWAGE AIR LIFT
Filed July 2, 1953

Inventor
LLEWELLYN B. GRIFFITH
By Henry H. Snelling

United States Patent Office 2,892,414
Patented June 30, 1959

2,892,414
SEWAGE AIR LIFT
Llewellyn B. Griffith, Arlington, Va.
Application July 2, 1953, Serial No. 365,743
3 Claims. (Cl. 103—232)

This invention relates to air lifts and has for its principal object the provision of a device that will operate well in sewage tanks even tho the sewage might sometimes have in it such organic material as large wads of rags, string, small pieces of cloth, etc. In present devices, the bits of string and the small rags will wrap around the usual air jets or injectors standing vertically in the air lift pipe, and the wads would be too large to pass thru a venturi restriction of the usual type.

A further object of the invention is to provide a simple and efficient unit for circulating water or sewage by means of a mass of finely divided bubbles of air.

Other objects of the invention are specifically stated in the claims and relate generally to the specific structure of the various members that make up the unit.

The general principle of the air lift is well known and the modern structures give little or no trouble with clean water but when the liquid to be moved is contaminated with certain types of foreign matter they frequently clog with consequent interruption of the system. By introducing the air at one side of the pipe, rather than at the bottom, by holding the volume and the pressure of the air stream at optimum levels, by mixing the air with a quantity of liquid before introducing the air into the air lift pipe, and by impinging the air-liquid mixture strongly against the far wall of the vertical section of the elevating portion of the eduction pipe to break up the small air bubbles into still tinier spheres I find that I can raise sewage that contains all manner of foreign objects providing these objects can enter the open bottom or other intake of the eduction pipe.

Figure 1:
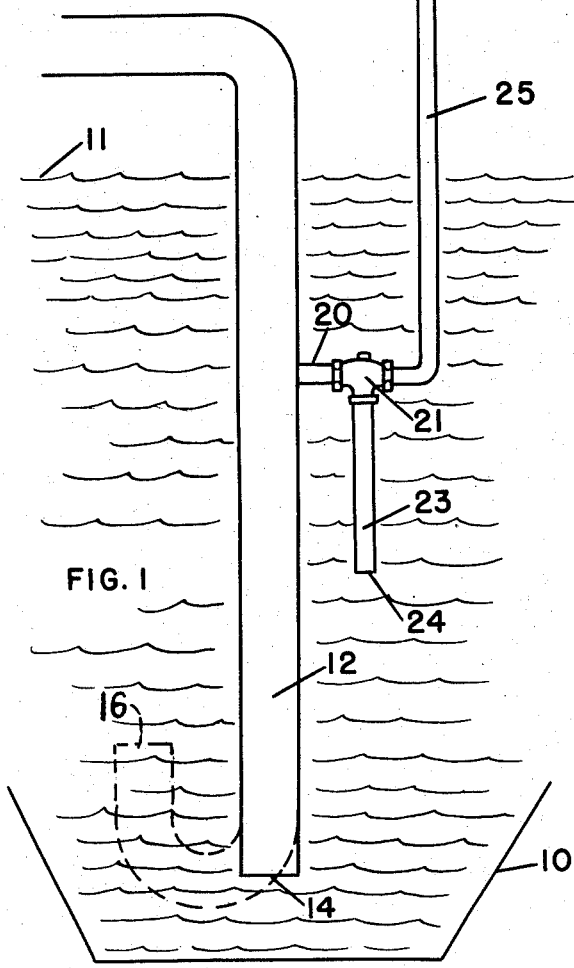
Figure 1 is a partial section of a sewage tank embodying the invention.
Figure 2:
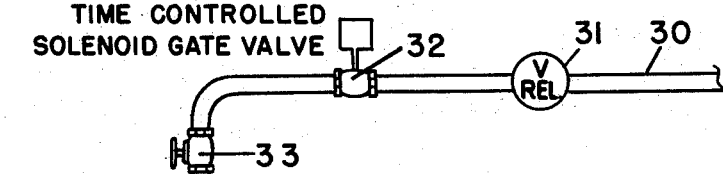
Figure 2 is an enlarged view of the body forming the mixing chamber.
Figure 2:
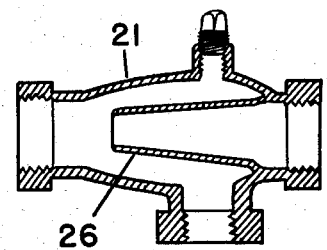

The tank 10 includes a hopper bottom for collection of solids or sludge, and has a water level that may vary by perhaps six inches from the line 11. The air lift pipe 12, which is an eduction pipe or discharge pipe, has an open end beneath the liquid level, usually as at 14 just above the bottom but if desired this pipe may be continued upwardly to have its intake nearer the liquid level as indicated by the dotted lines 16.

At a point below the water level 11 to match the pressure of the water at that depth with the desired air pressure, I fasten a nipple 20 radially of the eduction pipe 12 to afford communication between the pipe and an ellipsoidal body forming a mixing chamber 21. A water inlet tube 23 leads from the bottom of the mixing chamber to a depth to insure, at the start of air lift operation, against the pressure of the air discharging air from the open bottom 24 of the tube, usually six inches below the level at which the normal air pressure equals the pressure in the air pipe 25. A strainer may be used wherever believed necessary. The air pipe discharges thru a nozzle 26 of any of the usual configurations, but seemingly a conical nozzle operates at as great an efficiency as any of the more expensive types.

Air under pressure from any desired source enters thru a portion of the horizontal air supply pipe 30 which carries a pressure regulator valve 31, and a time controlled solenoid gate valve 32 to operate the air lift at desired intervals for chosen periods. A control valve 33, preferably at some point convenient for manual adjustment, governs the quantity of air that is to flow, while the valve 31 governs the pressure in pounds per square inch.

Merely as an illustration, and not as limiting the scope of the claims, the tube may be an inch in diameter, the air pipe double that, and the discharge pipe still larger in diameter.

Knowing the desired lift, that is the distance from the water level to the highest point in the eduction pipe 12, and that this lift should be less than 50% of the sum of this lift and the submergence ditsance below the water level of the mixing chamber 21, the air pressure is chosen to correspond to the submerged depth of the mixing chamber, perhaps nine feet, equivalent to a pressure of 3.6 p.s.i. plus the impinging pressure desired. The bottom of tube 23 is placed at least six inches below this, its length being determined by the pressure needed to atomize the bubbles to tiny size. The point of entry of the tube into the chamber is placed from six inches to a foot above the equal pressure point, that is, the level at which the water pressure will equal the pressure of the air supply. Thus when the air pressure is off, water would rise in all of the pipes except for the fact that the solenoid valve closes tight, this being desirable in order to avoid settlement in the impinger. When the air is turned on by the time controlled solenoid, the air pipe is filled with air not only to the mixing chamber but also at least half way down the water suction tube, but air never discharges from the bottom of the tube.

It is my preference that the major axis of the chamber and the axis of the nozzle be in a line that if extended would be a diameter of the air lift pipe, and that the intake from the tube into the chamber be at right angles to and half way between the end of the nozzle and the entrance to the nipple. The air stream from the nozzle draws water into the tube from below, mixes thoroughly with this water, and discharges against the opposite wall of the air lift pipe with impinging action, serving to break the already small bubbles into tiny bubbles which spread evenly thruout the length of the pipe above the point of entry and thus lift the sewage and any trash that may be therein. As well known the lifting power of the air varies with the area of the surfaces of the bubbles, hence by minimizing the size of the bubbles by the impingement against the wall of the eduction pipe, the lifting power of the air is made greatest and slippage of the bubbles thru the liquid is practically eliminated.

What I claim is:

1. An air lift assembly particularly suited for handling sewage that may carry extraneous non-organic matter from a tank, comprising an eduction pipe having an open end in the tank below the liquid level thereof, a body forming a mixing chamber having an exit communicating with the pipe, a liquid inlet tube extending downward from the chamber into the tank, with its lower end at a level above the entry end of the eduction pipe, an air pipe having a nozzle directing air across the chamber to said exit, and a tight-closing gate valve in said air pipe to limit rising of water in the liquid inlet tube when the gate valve is closed.

2. In combination, an unobstructed vertical eduction pipe of uniform inside diameter, a body forming a mixing chamber having an axis radial of the pipe, a nipple shorter in length than the length of the body and coaxial therewith providing a straight passageway connecting the pipe and the body, a vertical water suction tube extending downwardly from the mixing chamber body with its lower open end at a level above the entry end of the eduction pipe, for delivering liquid to the chamber, and a conical nozzle within the mixing chamber body coaxial with the passageway and means for delivering air under pressure into the chamber through the nozzle to mix with the water entering the chamber from the tube and for discharging the liquid against the inner opposite wall of the eduction pipe with impinging action to form a mass of finely divided air bubbles in the eduction pipe.

3. In combination, an approximately vertical pipe, an ellipsoidal body forming a mixing chamber having a major dimension approximating the diameter of the pipe, a straight nipple radial to the pipe, joining the body and the pipe and of a diameter less than half that of the pipe, an air passageway including a conical nozzle within the chamber for delivering air under pressure, and a tube for conveying water to the chamber at right angles to the common axis of the nozzle, the body, and the nipple, whereby when the assembly is placed within a liquid containing tank with the open ends of the tube and of the pipe below the liquid level, the air will inject liquid into the chamber and deliver the air and liquid mixture against the far wall of the pipe to break up the air bubbles into bubbles of smaller size.

References Cited in the file of this patent

UNITED STATES PATENTS

| | | |
|---|---|---|
| 1,005,108 | Eliel | Oct. 3, 1911 |
| 1,276,373 | Jones | Aug. 20, 1918 |
| 1,291,130 | Purchas | Jan. 14, 1919 |
| 1,316,507 | Pollard | Sept. 16, 1919 |

FOREIGN PATENTS

| | | |
|---|---|---|
| 23,281 | Great Britain | of 1908 |